US009019514B2

(12) United States Patent
Rich et al.

(10) Patent No.: US 9,019,514 B2
(45) Date of Patent: Apr. 28, 2015

(54) HALFTONE PRINTING OF METAL-PIGMENTED INKS TO PRODUCE VARIOUS METALLIC APPEARANCES

(75) Inventors: Danny Rich, Hamilton Square, NJ (US); Veronika Lovell, Westland, MI (US)

(73) Assignee: Sun Chemical Corporation, Parsippany, NJ (US)

( * ) Notice: Subject to any disclaimer, the term of this patent is extended or adjusted under 35 U.S.C. 154(b) by 406 days.

(21) Appl. No.: 13/061,313

(22) PCT Filed: Sep. 4, 2009

(86) PCT No.: PCT/US2009/056097
§ 371 (c)(1),
(2), (4) Date: Apr. 5, 2011

(87) PCT Pub. No.: WO2010/028285
PCT Pub. Date: Mar. 11, 2010

(65) Prior Publication Data
US 2012/0033263 A1  Feb. 9, 2012

Related U.S. Application Data

(63) Continuation-in-part of application No. 12/583,938, filed on Aug. 27, 2009, now Pat. No. 8,467,098.

(60) Provisional application No. 61/094,103, filed on Sep. 4, 2008.

(51) Int. Cl.
H04N 1/40     (2006.01)
B41M 5/00     (2006.01)
H04N 1/405    (2006.01)
H04N 1/54     (2006.01)

(52) U.S. Cl.
CPC ............. B41M 5/0023 (2013.01); H04N 1/405 (2013.01); H04N 1/54 (2013.01)

(58) Field of Classification Search
USPC .......... 358/1.9, 2.1, 3.06, 3.09, 1.6, 3.2, 3.24, 358/3.3, 1.13, 1.18, 468, 500, 504, 400, 406
See application file for complete search history.

(56) References Cited

U.S. PATENT DOCUMENTS 6,710,103 B2 * 3/2004 Norris et al. ................... 523/200
6,845,219 B2 * 1/2005 Yamamuro et al. ............. 399/13
6,885,830 B2 * 4/2005 Hirota et al. .................... 399/12
(Continued)

FOREIGN PATENT DOCUMENTS

JP  H09-201989 A   8/1997
JP  2002-264495 A  9/2002
(Continued)

OTHER PUBLICATIONS

International Search Report and Written Opinion issued for International Application No. PCT/US2009/056097, International Filing Date Sep. 4, 2009, Date of Mailing Oct. 21, 2009.
(Continued)

Primary Examiner — Thomas D Lee
Assistant Examiner — Stephen M Brinich
(74) Attorney, Agent, or Firm — Charles C. Achkar; Ostrolenk Faber LLP

(57) ABSTRACT

A system and method for producing a wide range of metallic appearances using halftones of a nano-particle metallic ink, such as, for example, nano-silver, are presented. In exemplary embodiments of the present invention, a nano-particle metallic ink, such as, for example, nano-silver, can be made to produce a range of appearances from, for example, bright silver to dull oxidized aluminum, by changing halftone level of the silver inks, changing the substrate surface properties and introducing small amounts of other colored inks, such as process or spot, in either an underprinting or overprinting of the metallic ink. In exemplary embodiments of the present invention, InkJet printing of a single metal-pigmented ink can be effected, and its metallic appearance can very quickly be adjusted to match a given package design.

15 Claims, 19 Drawing Sheets

(56) References Cited

U.S. PATENT DOCUMENTS

| | | |
|---|---|---|
| 2002/0008880 A1 | 1/2002 | Dewitte et al. |
| 2003/0058291 A1 | 3/2003 | Pinard et al. |
| 2004/0202832 A1 | 10/2004 | Nigam et al. |
| 2007/0002119 A1 | 1/2007 | Abrott |

FOREIGN PATENT DOCUMENTS

| | | |
|---|---|---|
| JP | 2002-300414 A | 10/2002 |
| JP | 2002-325152 A | 11/2002 |
| JP | 2003-306625 A | 10/2003 |
| JP | 2006-33512 A | 2/2006 |
| JP | 2006-124826 A | 5/2006 |
| JP | 2007-297423 A | 11/2007 |
| JP | 2008-188973 A | 8/2008 |

OTHER PUBLICATIONS

Office Action (Notice of Reasons for Rejection) mailed Oct. 29, 2013 in connection with Japanese Patent Application No. 2011-526245.

* cited by examiner

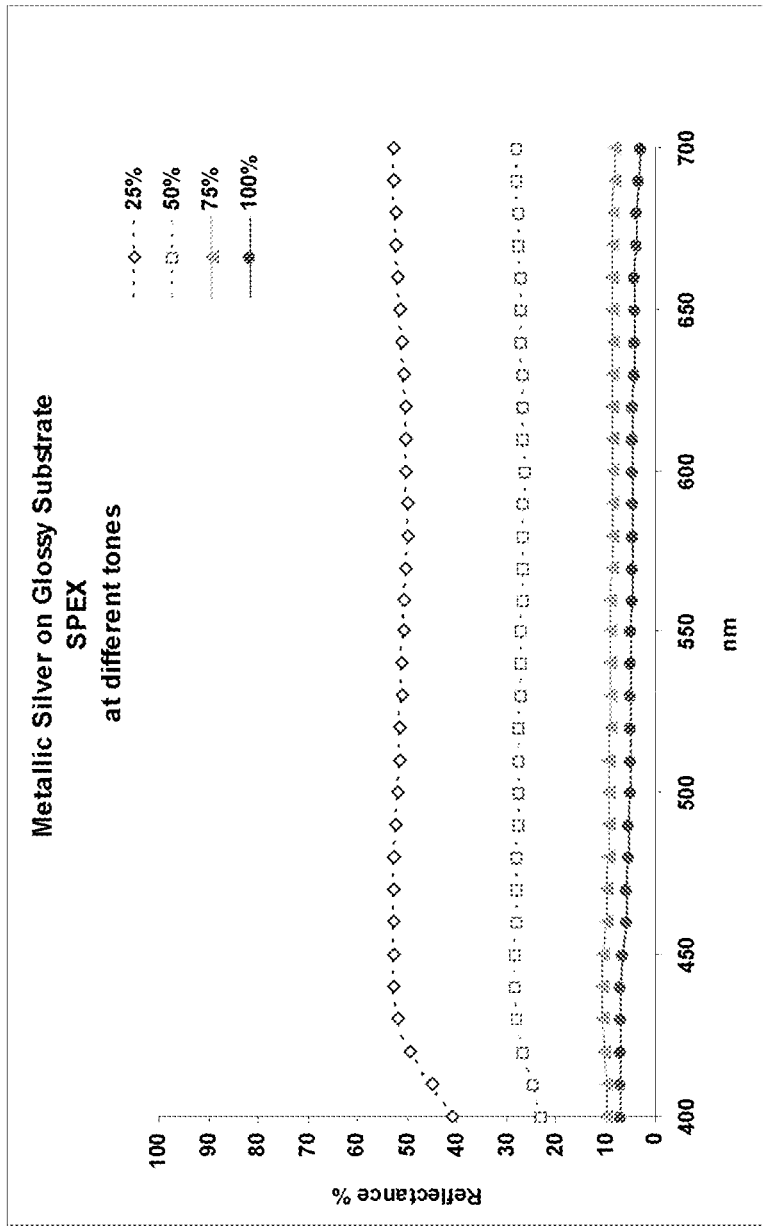

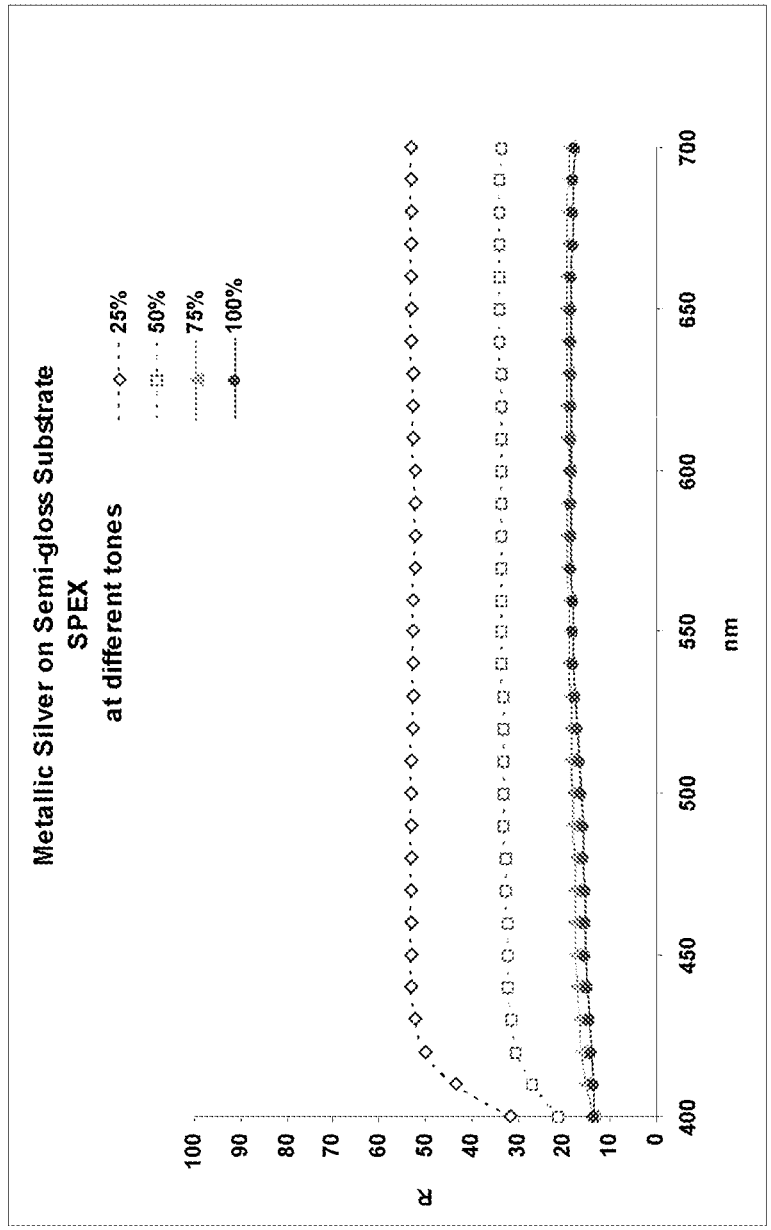

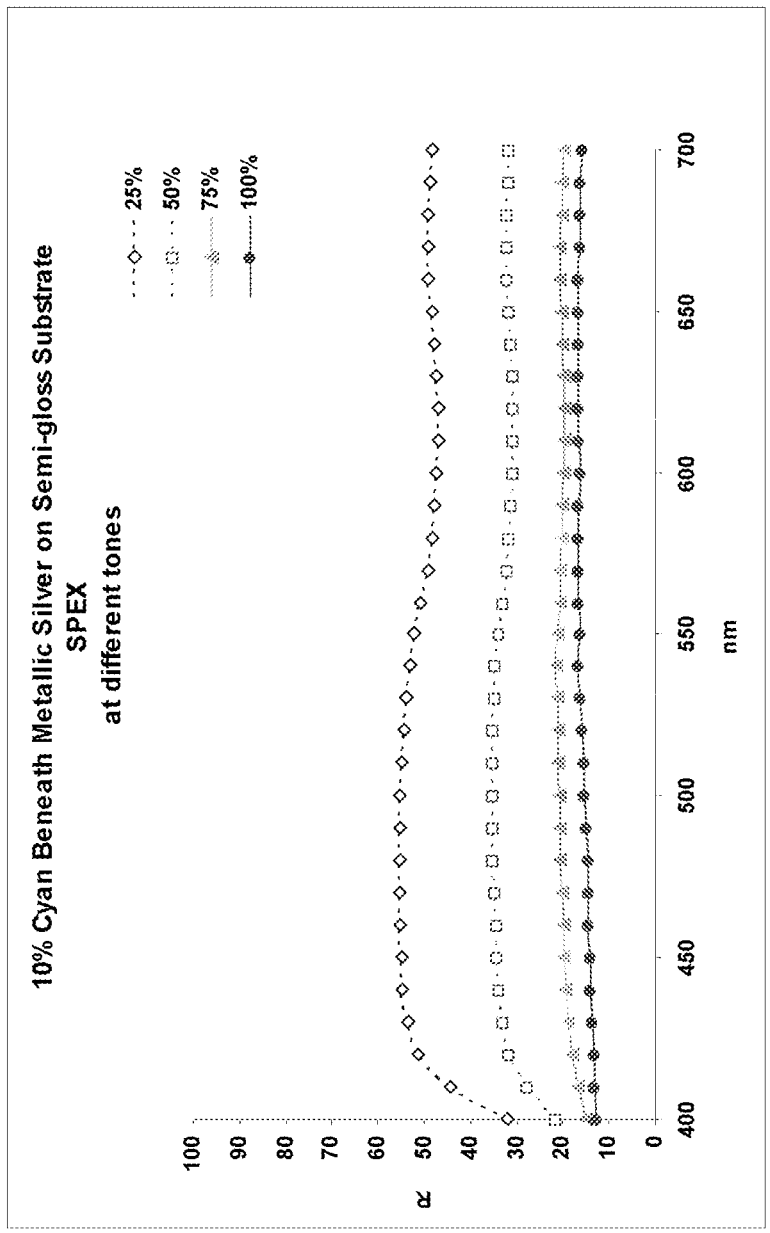

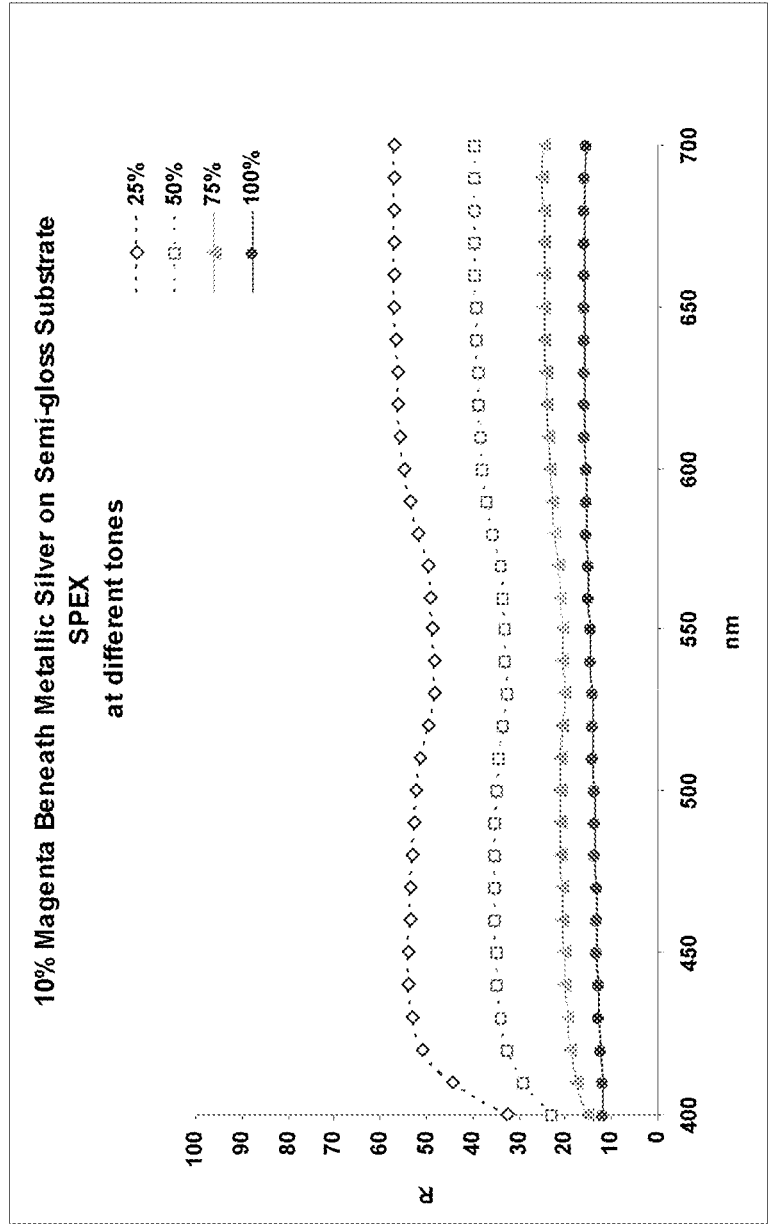

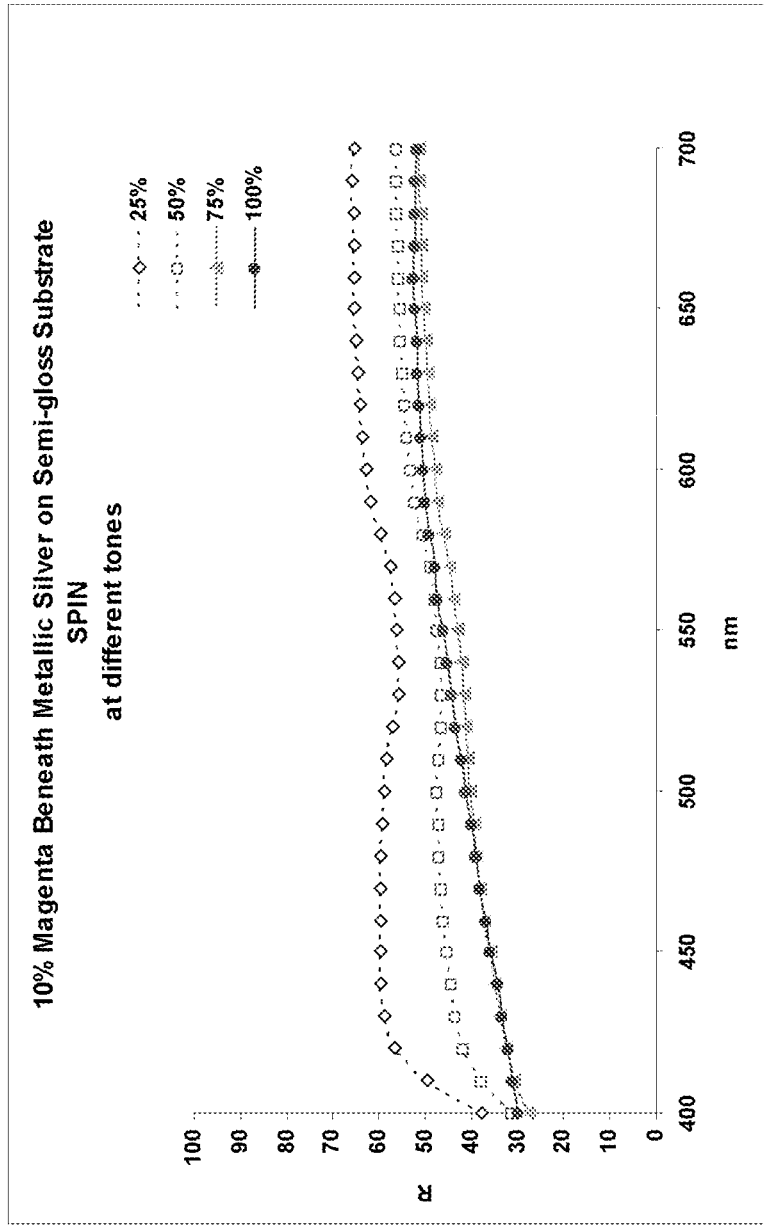

HALFTONE PRINTING OF METAL-PIGMENTED INKS TO PRODUCE VARIOUS METALLIC APPEARANCES

CROSS REFERENCE TO RELATED APPLICATIONS

This application is the United States national phase filing of the corresponding international application number PCT/US2009/056097, filed on Sep. 4, 2009, which claims priority to and benefit of U.S. Provisional Application No. 61/094,103, filed Sep. 4, 2008, and U.S. application Ser. No. 12/583,938, filed on Aug. 27, 2009 which applications are hereby incorporated by reference in their entirety.

TECHNICAL FIELD

The present invention relates to color ink production, and more particularly to adjusting the appearance of printed metallic inks by controlling various parameters including halftone level, substrate surface properties and the presence of other colored inks.

BACKGROUND OF THE INVENTION

Current commercial offerings of metal-pigmented inks cannot be successfully used in a proofing application except as transferred via thermal transfer. This is because metallic pigments are produced as flakes which have a large aspect, their length to width, may be tens, or even hundreds, of microns in size. This makes it very difficult to pass the metal flake through the narrow orifice of a typical inkjet head. Similarly, toner based digital proofing systems rely on electrostatic or electro-dynamic forces to hold the toner particles on the image drum. However, metal flakes are conductive and thus bleed the charges off, allowing the toner to fall off of the image drum before printing can occur. There have been no commercial solutions known to the inventors that have addressed these problems.

On the other hand, thermal transfer uses a plastic donor sheet on which a clear resin coating with dispersed pigment has been cast. The print heads contain heating elements that raise the temperature of the coating until it becomes fluid and then is transferred by contact with the receiving sheet. These thermal transfer films are produced in much the same way as paint films and the metallic flakes are dispersed into the polymeric resin before being cast onto the plastic sheets. The thermal transfer method is very slow and very expensive (proofs cost near $100.00 each for A3 format) and the imaging systems for applying the donor to a substrate can also be rather expensive (over $10,000). Such a system can be, for example, a proofing printer such as the Kodak Approval NX and XP, shown at, for example, http://graphics.kodak.com/US/en/product/proofing/kodak_approval/default.htm?_requestid=5068.

Moreover, when using such thermal transfer technology, the level of brightness must be developed on the donor roll. This requires development and warehousing of multiple donor rolls with varying metallic pigments. For example, paint coatings have five or six levels. Converters that produce brochures for the automotive industry generally offer three levels, bright, medium and dull—giving appearances from that of the shiny front side of a sheet of foil down to an unpolished metal sheet.

What is needed in the art is an inexpensive method to vary the appearance of metallic inks for use in proofing applications that can be easily iteratively repeated, so as to fully match a desired package or other substrate design.

BRIEF DESCRIPTION OF THE DRAWINGS

The following figures include a number of graphs that present the spectral characteristics of printed metallic ink on different substrates, at different tone coverage, and with and without additional colored inks printed underneath (or on top of) them.

To generate the data presented in the graphs, an X-Rite SP64 spectrophotometer with sphere geometry was utilized to measure specular included (SPIN) as well as specular excluded (SPEX) reflectance characteristics of the printed samples.

Figure 1A:
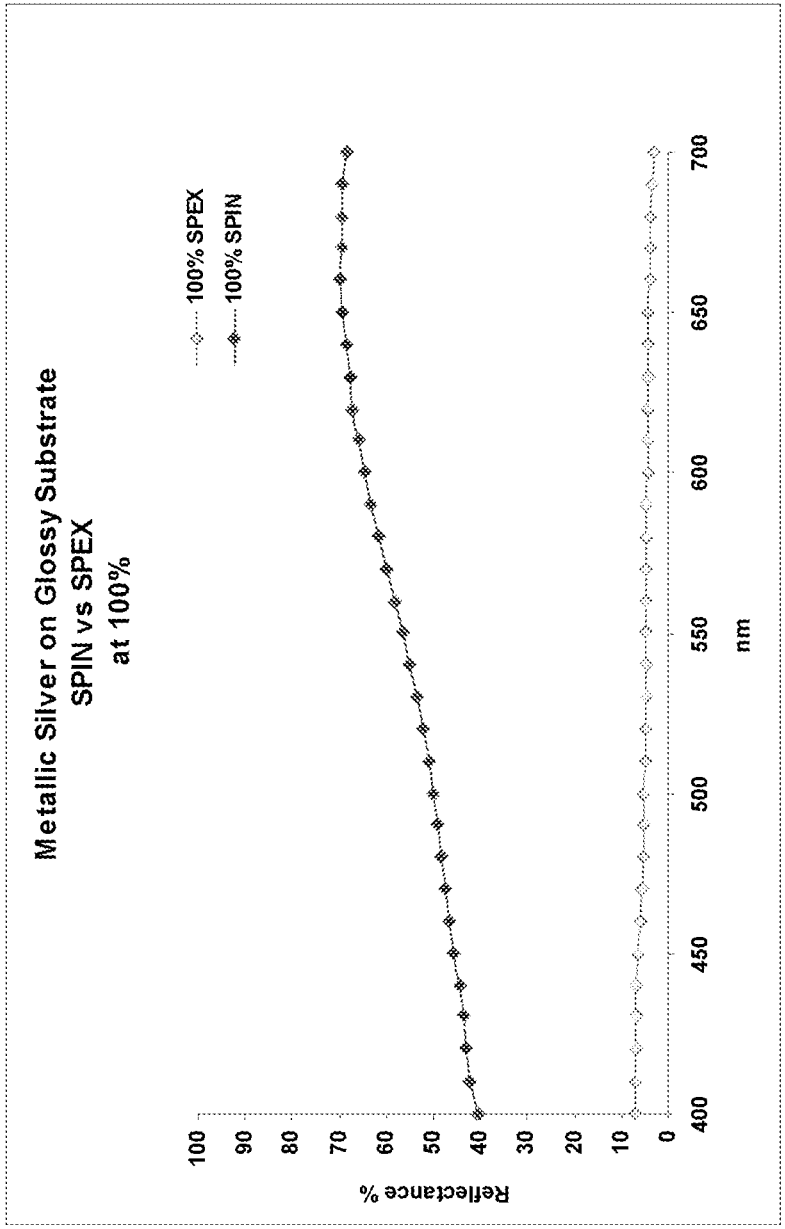
Figure 1B:
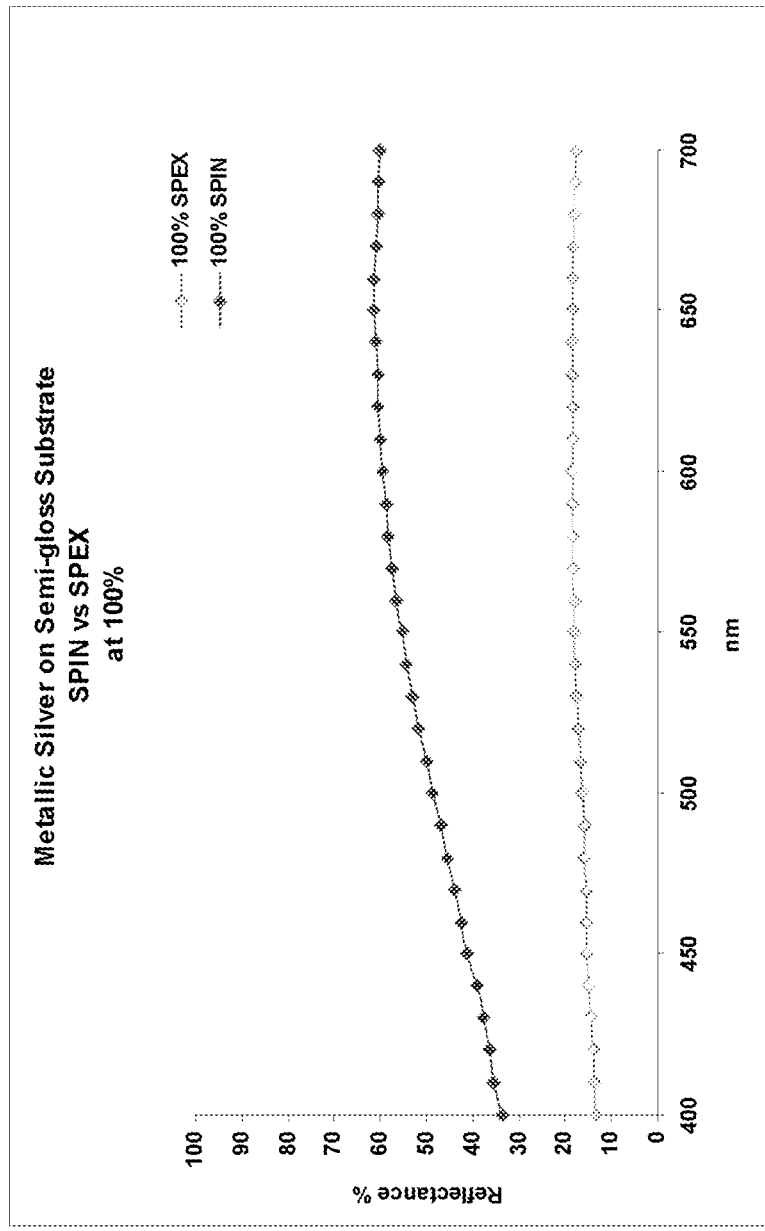
Figure 2B:
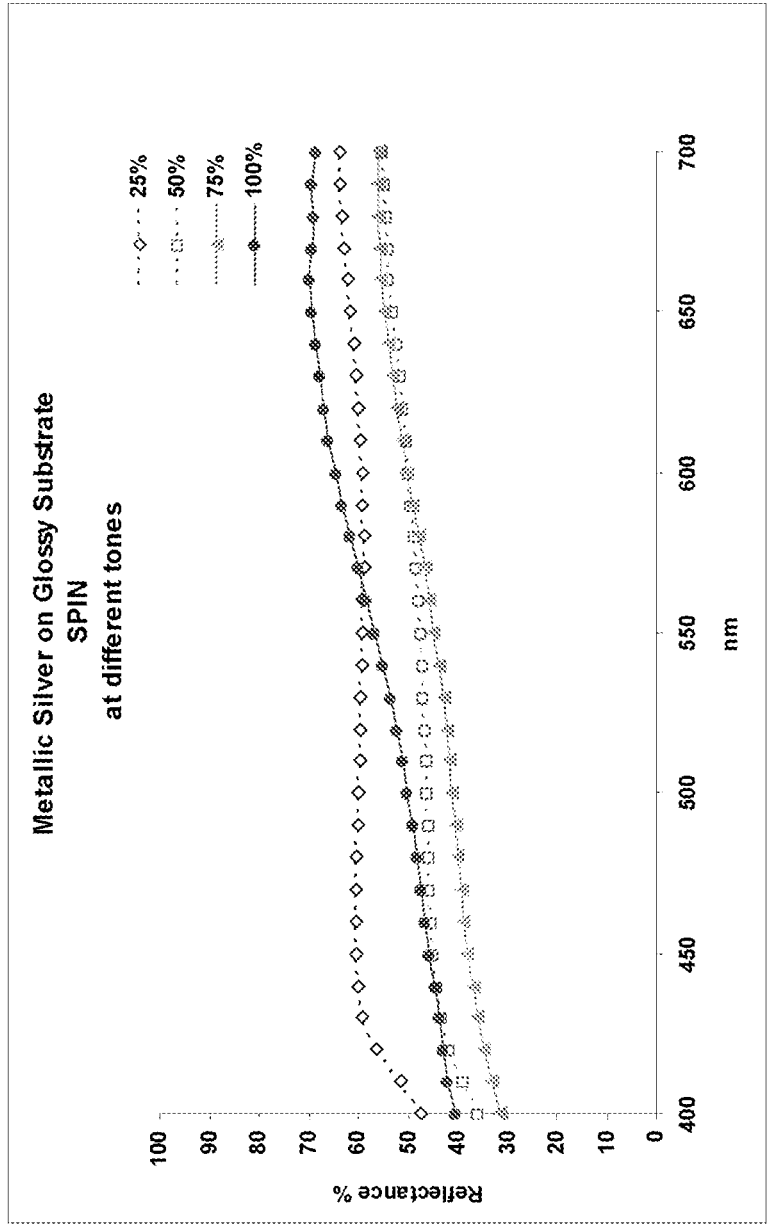
Figure 2D:
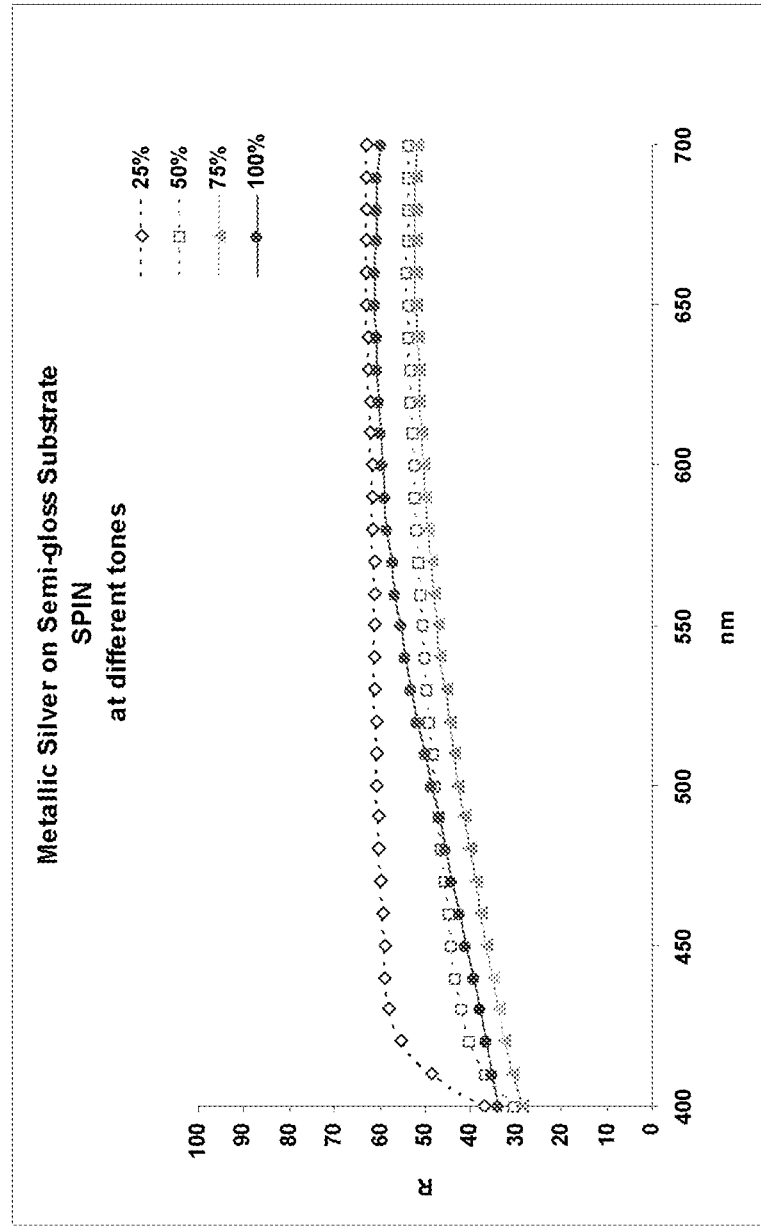
Figure 3A:
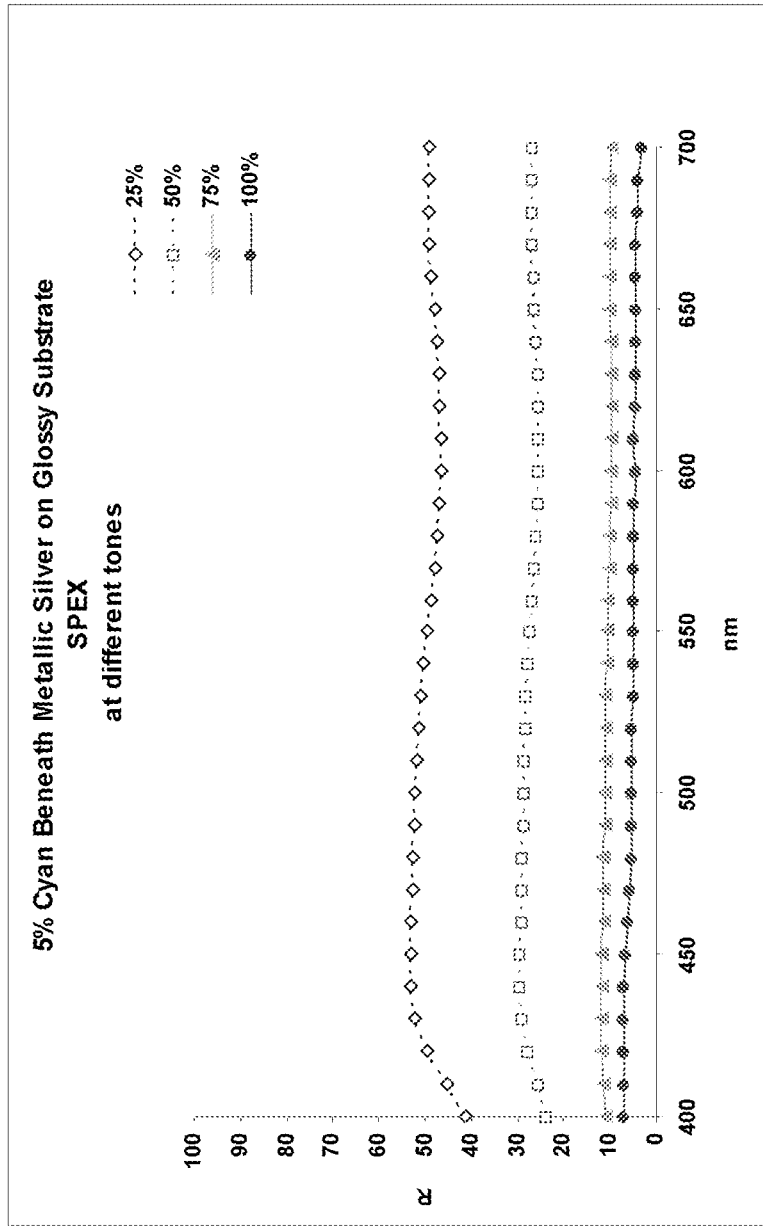
Figure 3B:
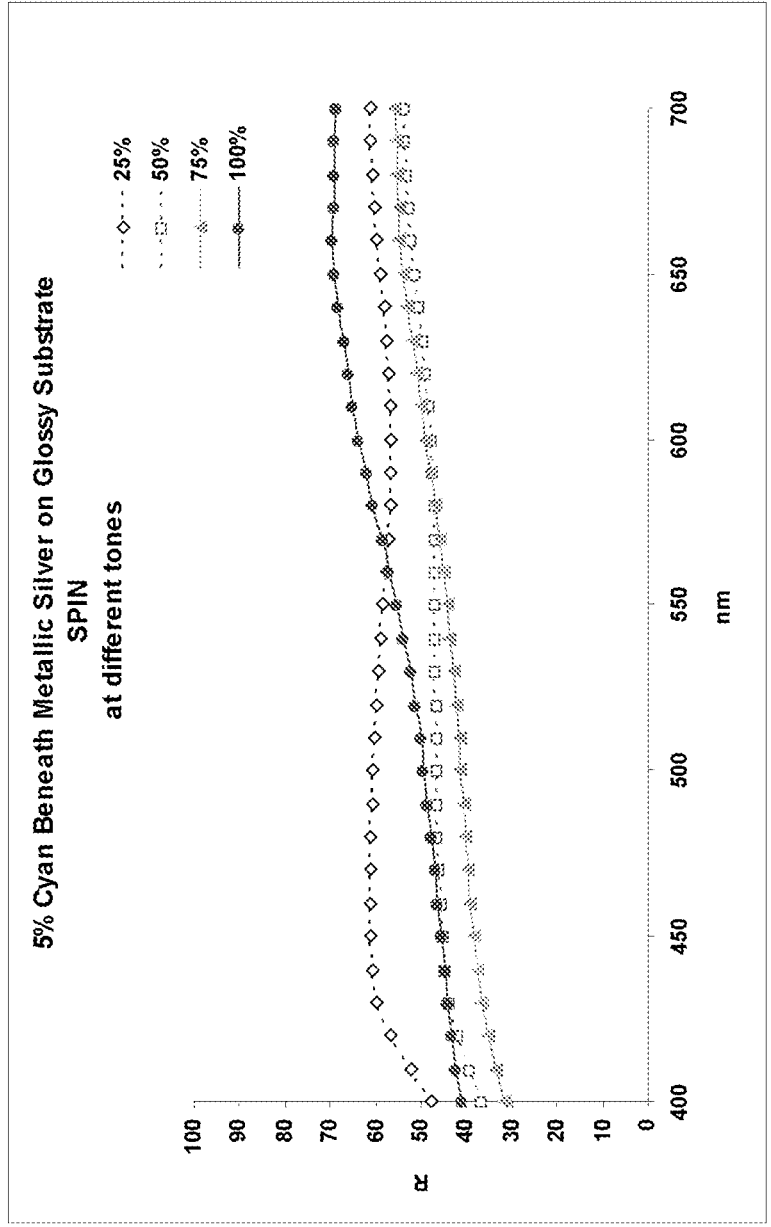
Figure 3C:
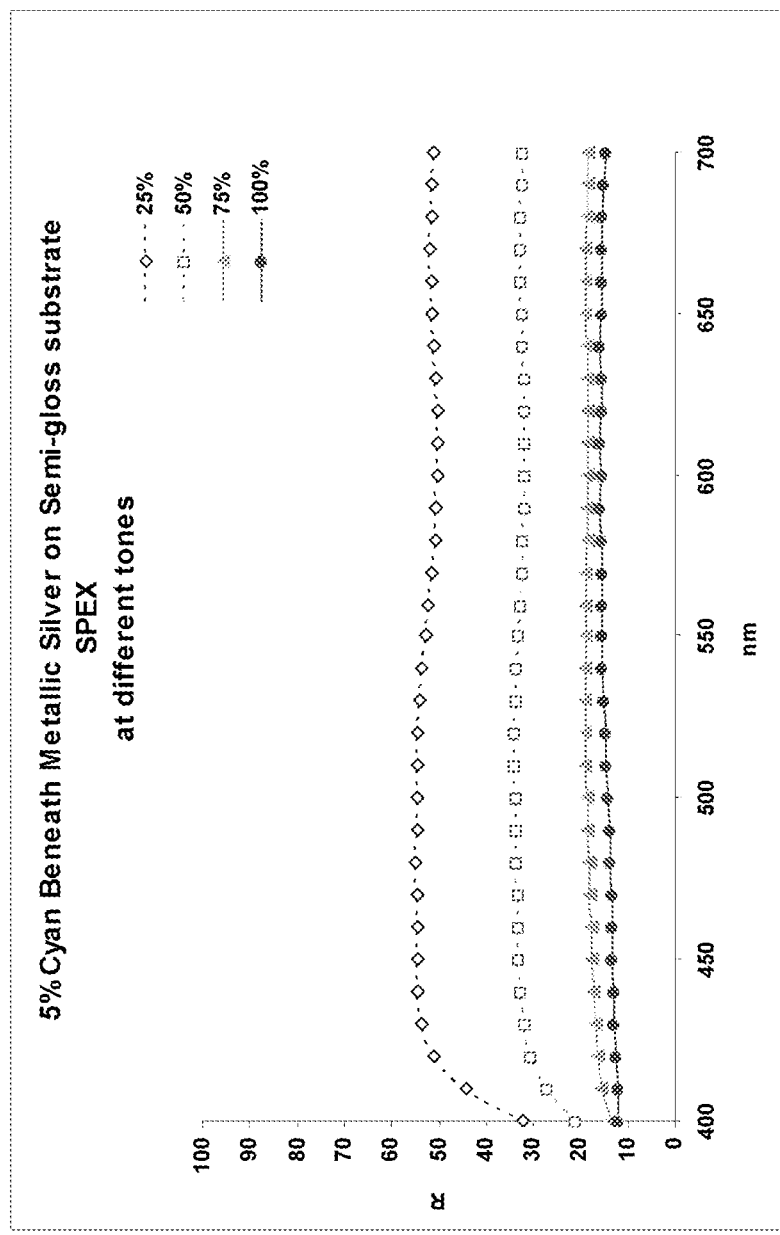
Figure 3D:
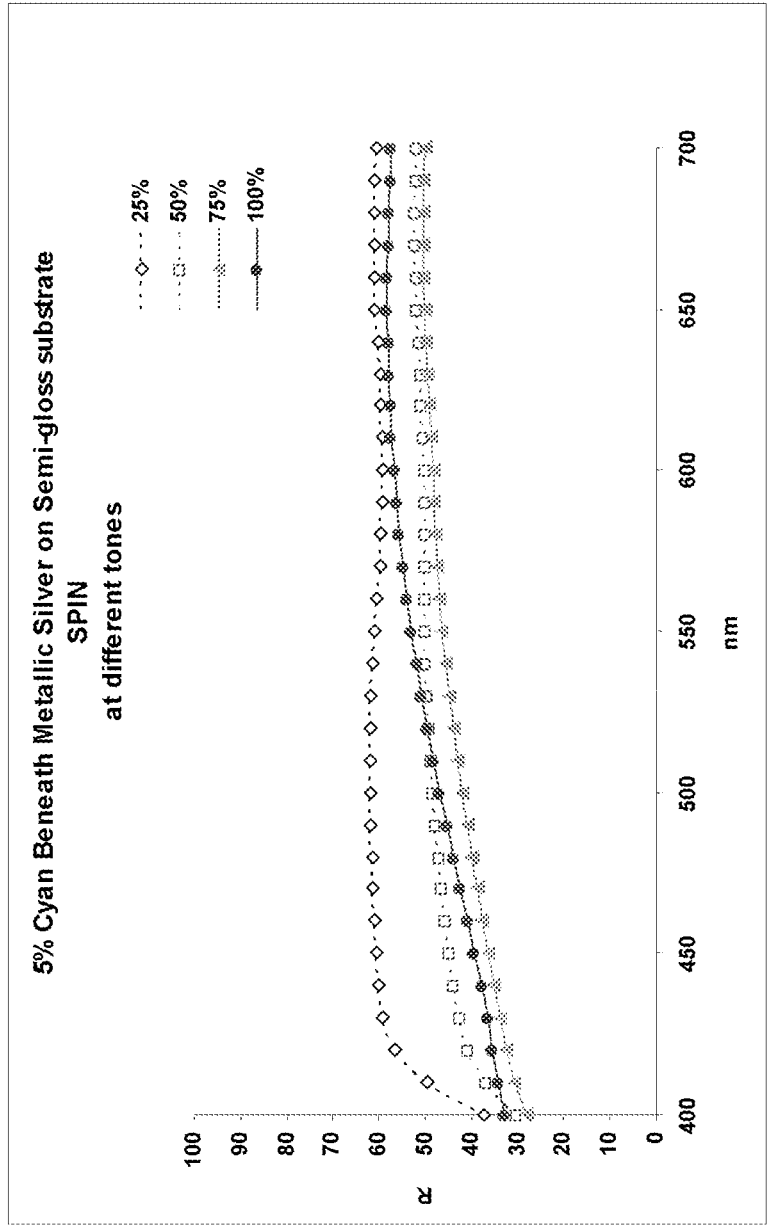
Figure 4A:
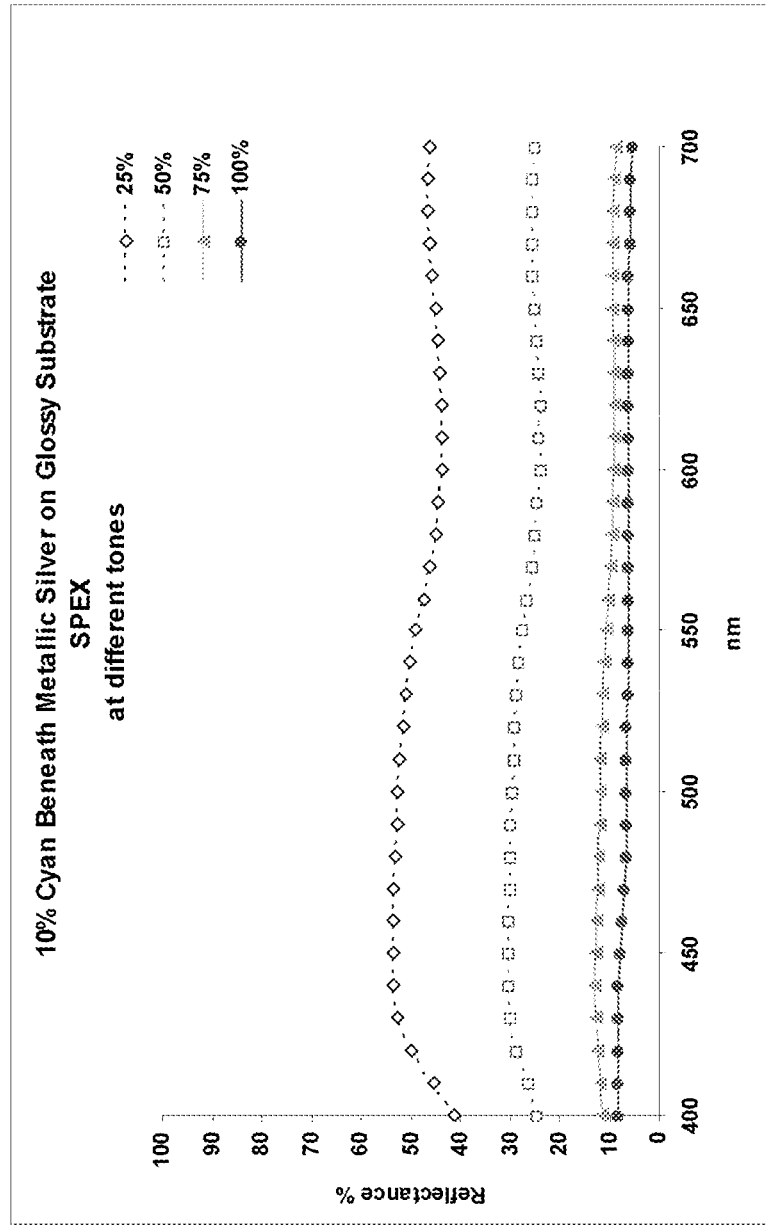
Figure 4B:
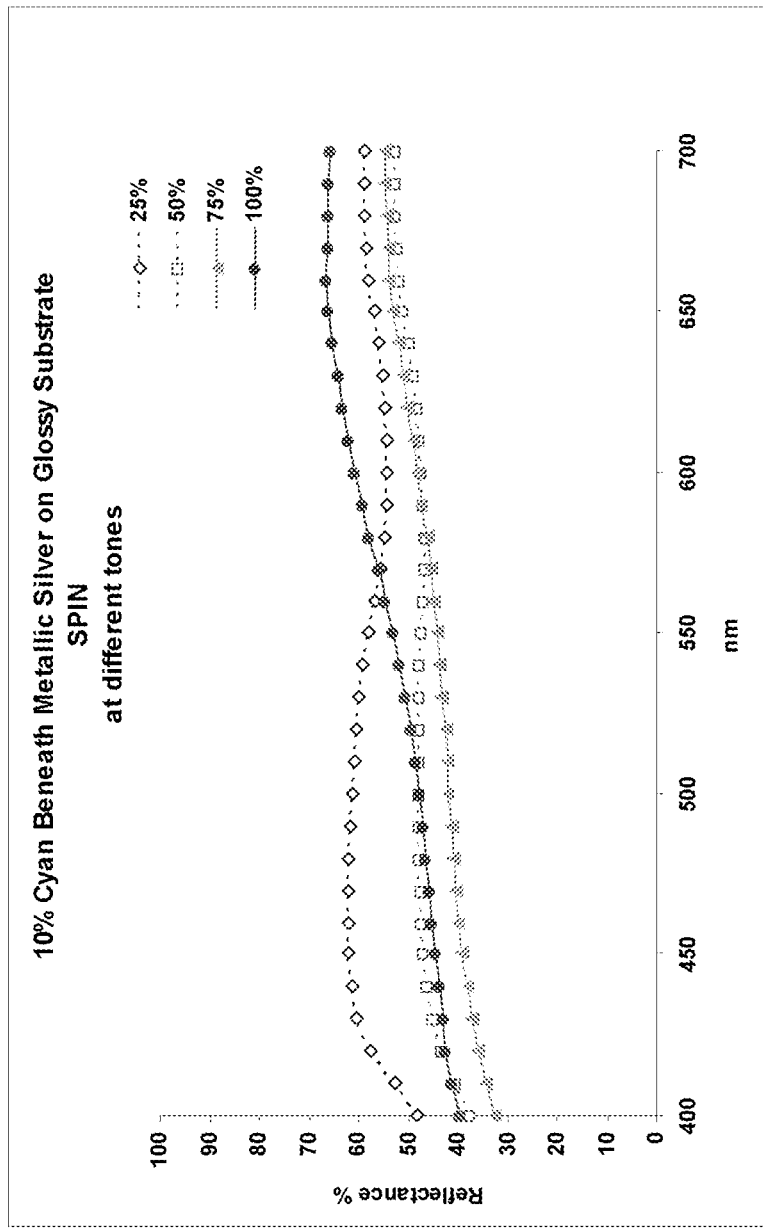
Figure 4D:
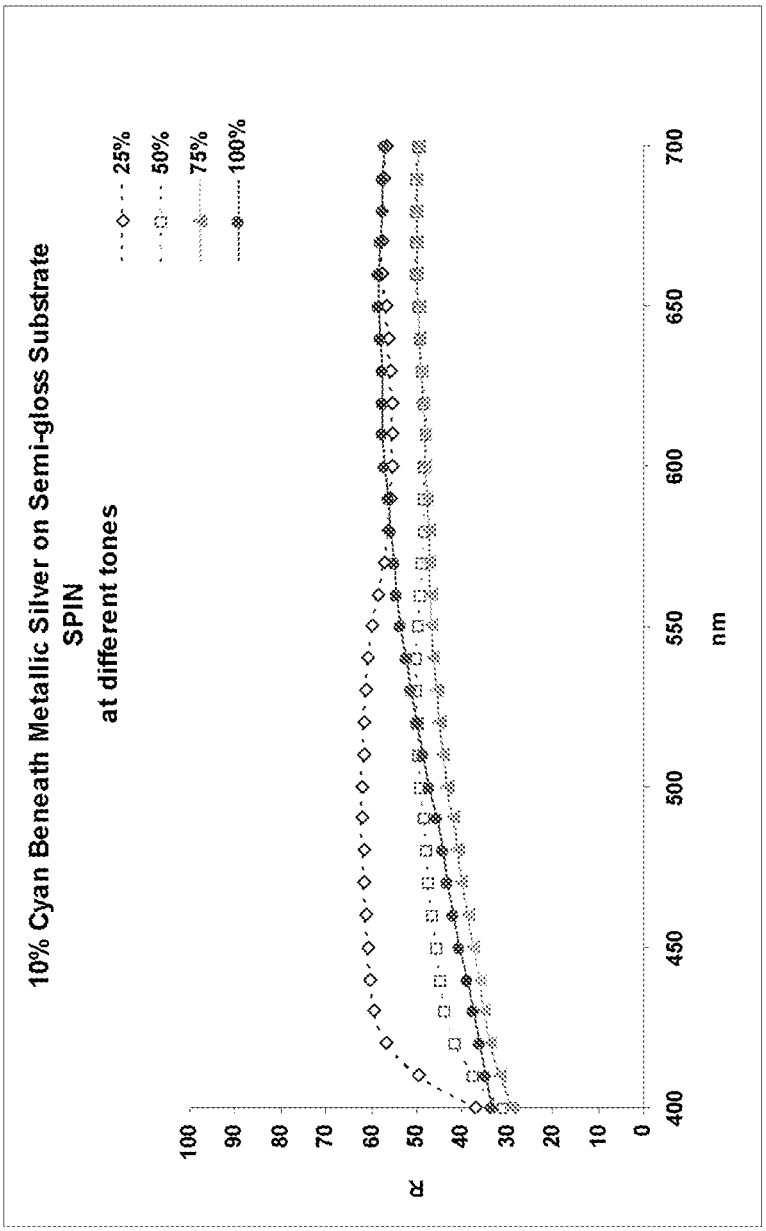
Figure 5A:
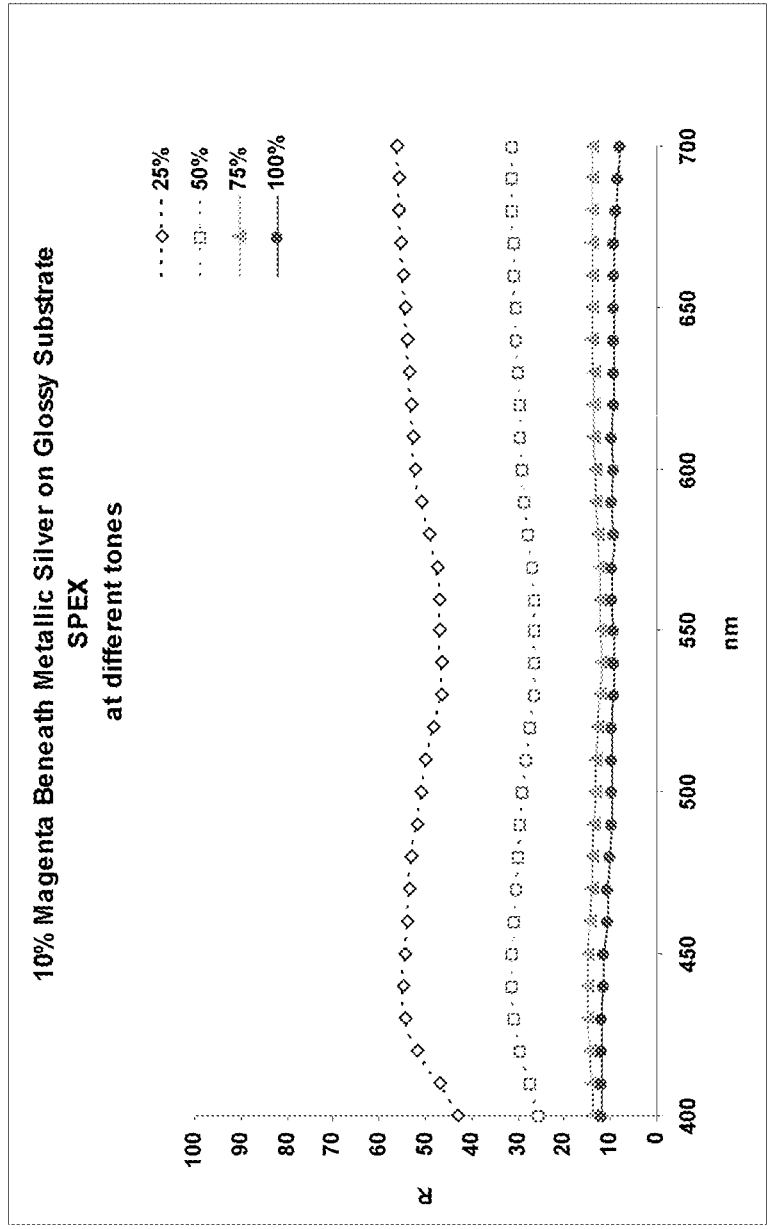
Figure 5B:
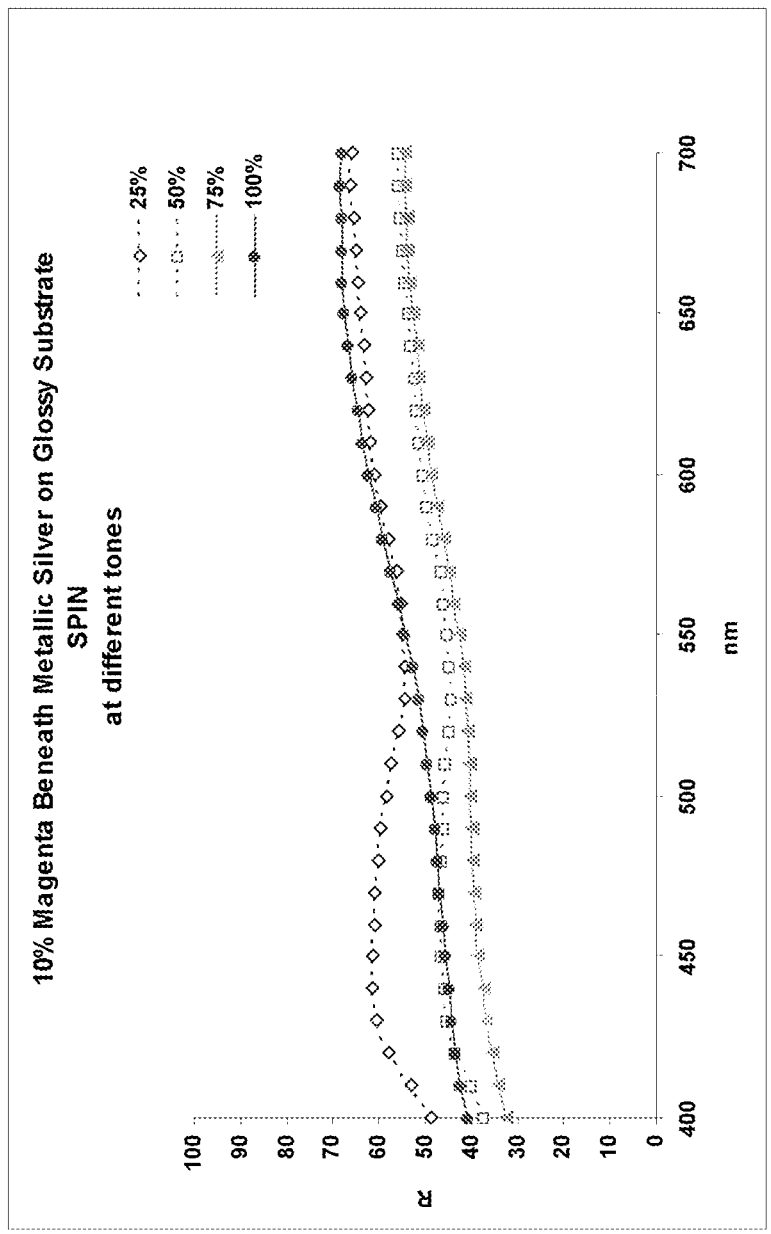
Figure 6:
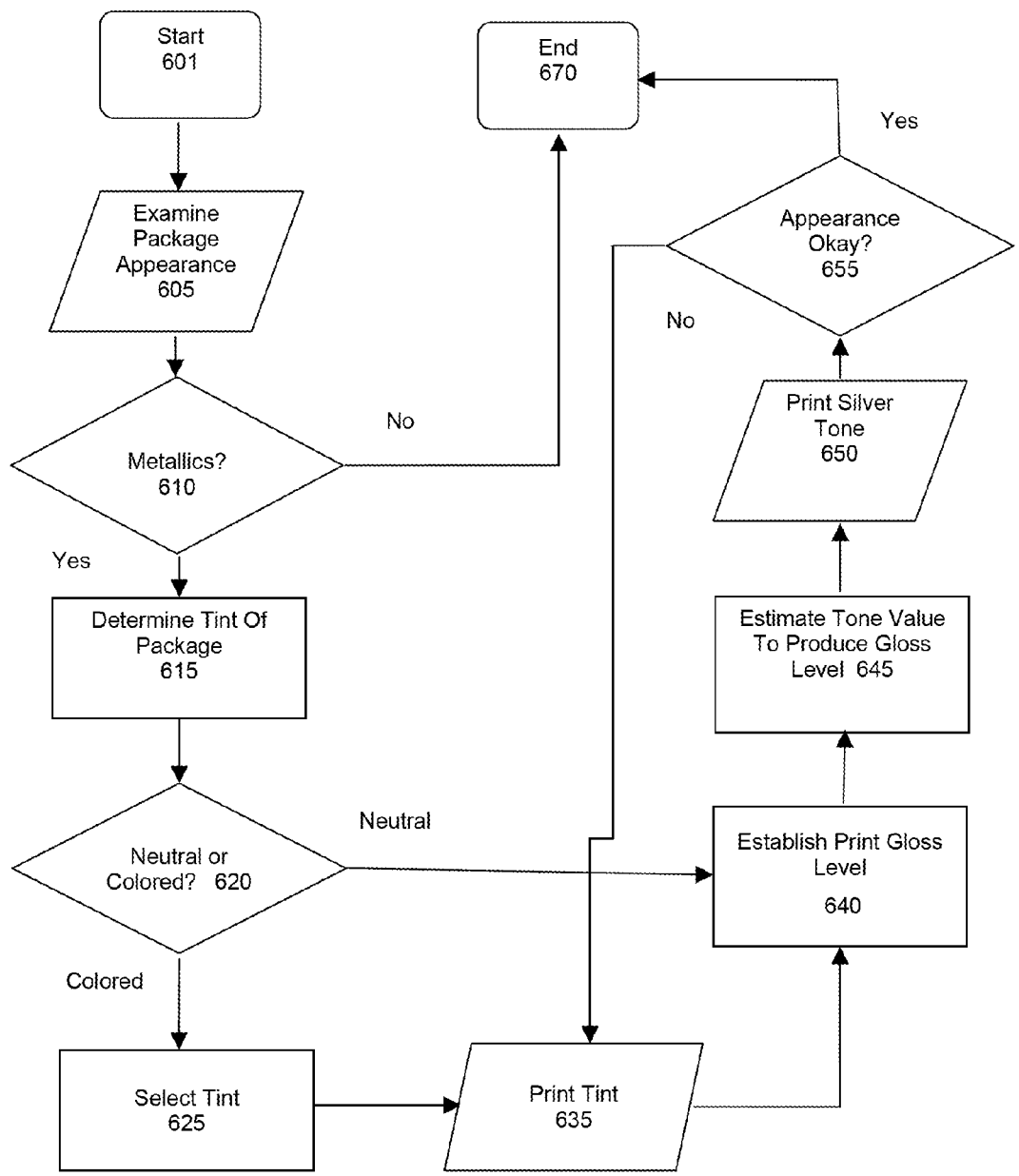

The features and advantages of the present invention will become apparent from the following description of the invention that refers to the accompanying drawings, in which:

FIG. 1(a) is a reflectance plot (SPIN v. SPEX) for a metallic silver ink printed on a glossy substrate according to an exemplary embodiment of the present invention;

FIG. 1(b) is a reflectance plot (SPIN v. SPEX) for a metallic silver ink printed on a semi-gloss substrate according to an exemplary embodiment of the present invention;

FIG. 2(a) is a SPEX reflectance plot for a metallic silver ink printed on a glossy substrate at various tones according to an exemplary embodiment of the present invention;

FIG. 2(b) is a SPIN reflectance plot for a metallic silver ink printed on a glossy substrate at various tones according to an exemplary embodiment of the present invention;

FIG. 2(c) is a SPEX reflectance plot for a metallic silver ink printed on a semi-gloss substrate at various tones according to an exemplary embodiment of the present invention;

FIG. 2(d) is a SPIN reflectance plot for a metallic silver ink printed on a semi-gloss substrate at various tones according to an exemplary embodiment of the present invention;

FIG. 3(a) is a SPEX reflectance plot for a metallic silver ink printed on a glossy substrate with 5% cyan color beneath at various tones according to an exemplary embodiment of the present invention;

FIG. 3(b) is a SPIN reflectance plot for a metallic silver ink printed on a glossy substrate with 5% cyan color beneath at various tones according to an exemplary embodiment of the present invention;

FIG. 3(c) is a SPEX reflectance plot for a metallic silver ink printed on a semi-gloss substrate with 5% cyan color beneath at various tones according to an exemplary embodiment of the present invention;

FIG. 3(d) is a SPIN reflectance plot for a metallic silver ink printed on a semi-gloss substrate with 5% cyan color beneath at various tones according to an exemplary embodiment of the present invention;

FIG. 4(a) is a SPEX reflectance plot for a metallic silver ink printed on a glossy substrate with 10% cyan color beneath at various tones according to an exemplary embodiment of the present invention;

FIG. 4(b) is a SPIN reflectance plot for a metallic silver ink printed on a glossy substrate with 10% cyan color beneath at various tones according to an exemplary embodiment of the present invention;

FIG. 4(c) is a SPEX reflectance plot for a metallic silver ink printed on a semi-gloss substrate with 10% cyan color beneath at various tones according to an exemplary embodiment of the present invention;

FIG. 4(d) is a SPIN reflectance plot for a metallic silver ink printed on a semi-gloss substrate with 10% cyan color beneath at various tones according to an exemplary embodiment of the present invention;

FIG. 5(a) is a SPEX reflectance plot for a metallic silver ink printed on a glossy substrate with 10% magenta color beneath at various tones according to an exemplary embodiment of the present invention;

FIG. 5(b) is a SPIN reflectance plot for a metallic silver ink printed on a glossy substrate with 10% magenta color beneath at various tones according to an exemplary embodiment of the present invention;

FIG. 5(c) is a SPEX reflectance plot for a metallic silver ink printed on a semi-gloss substrate with 10% magenta color beneath at various tones according to an exemplary embodiment of the present invention;

FIG. 5(d) is a SPIN reflectance plot for a metallic silver ink printed on a semi-gloss substrate with 10% magenta color beneath at various tones according to an exemplary embodiment of the present invention; and FIG. 6 is a process flow chart according to an exemplary embodiment of the present invention.

SUMMARY OF THE INVENTION

A system and method for producing a wide range of metallic appearances using halftones of a nano-particle metallic ink, such as, for example, nano-silver, are presented. In exemplary embodiments of the present invention, a nano-particle metallic ink, such as, for example, nano-silver, can be made to produce a range of appearances from, for example, bright silver to dull oxidized aluminum, by changing halftone level of the silver inks, changing the substrate surface properties and introducing small amounts of other colored inks, such as process or spot, in either an underprinting or overprinting of the metallic ink. In exemplary embodiments of the present invention, inkjet printing of a single metal-pigmented ink can be effected, and its metallic appearance can very quickly be adjusted to match a given package design.

DETAILED DESCRIPTION OF THE INVENTION

In exemplary embodiments of the present invention, inkjet printing of a single metal-pigmented ink can be effected, and its metallic appearance can very quickly be adjusted to match a given package design.

In exemplary embodiments of the present invention a method for adjusting the appearance of an inkjet printed metallic ink by controlling the halftone level, the substrate surface properties and the presence of other colored inks can be performed. In a normal halftone, the color of the ink is lightened by additive mixing of a fixed amount of ink with a varying amount of white from the substrate. However, when a metallic ink is printed, the solid is very shiny—like the surface of polished metal; but when such a metallic ink is printed in halftone, the ink not only gets lighter, the increasing separation of the dots also decreases the level of shininess. Thus, using properly controlled halftoning it is possible to make a bright silver ink look like a dull aluminum ink. Additionally, by combining halftoning with variation of substrate finish properties as well as using other inks in addition to the metallic, the additional inks can influence the setting of the metallic ink and thus the metallic appearance can also be altered. The metallic ink can be printed down first, or can be printed on top of the other ink, for example. In digital halftoning, ink is printed as a randomly positioned dot, surrounded by unprinted substrate. Thus, the appearance of the print is the combination of the appearance of an ink dot and the appearance of the substrate. By printing a second ink next to, under or over the first ink, one can change both the color and appearance of the metallic ink.

In conventional printing methods of a solid area with a metal-pigmented ink, the brightness of the print is a function of (i) the particle size, and (ii) the reflectivity of, the pigment. Exemplary inks can comprise pigments from the group of metallics, such as silver, gold, copper, nickel, cobalt, palladium, platinum, indium, tin, zinc, titanium, chromium and others. In exemplary embodiments of the present invention, a highly reflective metal can be used, such as, for example, nano-particles of silver, to pigment an ink. When printed as a solid on a glossy substrate, the resulting film can have a very bright appearance, much brighter than is typically available from either of offset, gravure or flexographic printed aluminum flake pigmented inks.

In exemplary embodiments of the present invention, by printing the nano-silver pigmented ink in tone steps using stochastic tone patterns, or by using a different substrate finish, the brightness of the print can be dulled to a certain extent by the diffuse reflectivity of the substrate.

It is noted that stochastic screening (or FM screening) is a type of halftone reproduction based not on different dot size but rather on the frequency or amount of the dots placed/jetted on the substrate per area. This screening is the major type screening used in the digital reproduction.

In exemplary embodiments of the present invention, substrates can comprise, for example, nanoporous or microporous, coated or uncoated, glossy, semi-glossy, luster, matte substrates, heavyweight or lightweight papers, opaque or transparent, treated or untreated, films. It is thus possible to produce a proof that can match any level of metallic appearance by adjusting the tone step or by selecting an appropriate substrate that produces the correct brightness. Such a combination of tone step and substrate can be chosen using a color library, such as, for example, the Sun Chemical SmartColour™ Global Shade Library, as described below.

Additionally, in exemplary embodiments of the present invention, the metallic appearance can also vary in shade when process inks are mixed in small amounts with metallic ink during an exemplary stochastic inkjet printing process or are printed either beneath or over the top of the metallic ink.

Using simple stochastic halftoning, a system is disclosed which can change the appearance of an inkjet printed metallic pigmented ink from that of a continuous, highly reflective metal substrate, such as silver, to a low luster surface, such as oxidized aluminum. The ink can, for example, comprise pigment from the group of metallics, such as silver, gold, copper, nickel, cobalt, palladium, platinum, indium, tin, zinc, titanium, chromium and others of this kind. This makes it possible to quantify and reproduce nearly any packaging printing effect that uses metallic inks in an inkjet-based laboratory proofing system that can build design validation and mockup proofs. As noted, when printed as a halftone, the color and gloss of the substrate affects the appearance of the metallic print. By adjusting the gloss and color of the surface of the substrate, it is possible to produce very shiny or rather dull appearances and make shifts in the hue from yellowish to bluish or reddish to greenish, changing the appearance from that of silver to aluminum or brass and from a clean copper or gold to an oxidized bronze. The substrates can comprise of nanoporous or microporous, coated or uncoated, glossy, semi-glossy, luster, matte substrates, heavyweight or lightweight papers, opaque or transparent, treated or untreated films.

In exemplary embodiments of the present invention, different color appearance results of a metallic print can thus be achieved. In the disclosed system one can change the appearance of an inkjet printed metallic pigmented ink from a highly reflective metal to a low luster surface with or without an addition of a color tint.

In one exemplary implementation, the inventors ink jetted silver nanoparticles that were incorporated in an ink jet ink water based formulation on different kinds of substrates. Alternative, for example, the proofing process could also be employed with solvent-based or UV-curable ink systems. Piezo head ink jet technology was used for the ink deposition onto substrates, but all other ink jet printing head types could also be used. Substrates varied from highly glossy photo papers with an ink jet receptive coating layer to film substrates with the surface that has been treated to accept the water based ink jet ink with silver nanoparticles. In one exemplary embodiment, a piezo head ink jet printer driven by a raster imaging processor in order to be able to control and adjust ink channels presented in the ink jet printer separately. RIPs—Raster Image Processors are able to control and drive the inks present in the printer as separate channels, giving the operator full control of the amount of the ink placed on a substrate.

The metal appearance varied from highly bright metallic finish almost mirror bright, through duller structured metal appearance on semi-gloss textured paper, to dull appearance on the matte substrates. The metallic appearance yields the best results when the metallic ink is jetted in one pass and the beneath or over coat is printed with a separate pass.

Different appearances can be achieved when different tone coverage is selected. The less shiny surface can be produced with a lower ink percentage. The metallic effect can also be altered with the presence of different colors by printing the pre-layer using either process or spot colors or combination of these with very low coverage and jetting the metallic ink on top of it in a subsequent step.

The system and methods of the present invention make it possible to quantify and reproduce nearly any packaging printing effect that uses metallic inks in an inkjet-based laboratory proofing system that can build design validation and mockup proofs.

In exemplary embodiments of the present invention, matching the metallic appearance of a SPOT, customer or designer supplied metallic color can be implemented in connection with adjusting the appearance of metallics using half-toning, under or overprinting of a CMYK color, or changing the substrate, as described below.

In exemplary embodiments according to the present invention such an optimum matching process can capitalize on the information contained in a shade library such as, for example, the SmartColour™ Global Shade Library provided by Sun Chemical Corporation of Parsippany, N.J., where both solid ink prints and tone scales printed at various film weights or plate frequencies on a multiple of job substrates are stored.

The creation of, application and communication/transmission of color information obtained from, a shade library has been disclosed in earlier patents under common assignment herewith. For example, U.S. Pat. No. 7,034,960 disclosed how to build a library of solid colors, U.S. Pat. No. 7,202,976 disclosed how to communicate the colors from a shade library electronically, and U.S. Pat. No. 7,268,918 disclosed how to control the metamerism in creating a unique color in an ink and at least one other material (plastic, paint, textile, paper) simultaneously using two or more shade libraries. Similarly, copending U.S. patent application Ser. No. 11/732,086 (U.S. Patent App. Pub. No. 2007/0263249) discloses the addition of halftone colors to a shade library. The disclosures of these three U.S. patents and this copending published patent application are hereby incorporated herein by reference in their entirety.

In exemplary embodiments of the present invention, a computerized shade library with a multitude of special color formulas can be used to find a metallic formula which simultaneously matches a product standard for both the solid color and at one or more tone steps between the full tone (solid) and the unprinted substrate. This can be accomplished, for example, where such a computerized color shade library is stored in a data structure, such as a database, by executing a simple computer search on the library requesting the record in the database that has the correct color coordinates (CIE L*a*b* or CIE XYZ) for both a solid color print and halftone printed color from a specific printing process using a specific production substrate (e.g., clear film, opaque film, foil, board, paper, etc). The formula which matches the desired color at each of these points will be a unique composition of matter.

In such a database, each record can contain, for example, the ink formula, the combination of colorants and resin, the spectral reflectance factor of the ink and substrate, color values (XYZ and CIELAB) of the solid ink color (100% tone) and 10% steps down to 0% (unprinted substrate). In such a database halftones can be specified in units of % (0% to 100%), but can also, for example, be given as 8-bit integers (0 to 255).

Once an appropriate metallic ink formulation that matches a given SPOT color at both solid and various tone steps is obtained, the metallic appearance can be adjusted using one or more of the techniques as described hereinabove, and exemplified below in Examples 1-3. It is noted in this context that if one simply prints a metallic color, such as, for example, using a nano-silver ink, as disclosed in U.S. Patent App. Pub. No. 2007/0263249, for example, one will obtain an appearance that is not typical of an actual package print based on offset or gravure printing. However, using the presently disclosed techniques, the appearance of the package can be modified, systematically by changing either, the under color or the halftone level or both to achieve an appearance that is similar to the normal and commercially desired appearance.

In exemplary embodiments of the present invention, a system such as any described in U.S. Pat. No. 7,034,960, U.S. Pat. No. 7,202,976, U.S. Pat. No. 7,268,918 or U.S. patent application Ser. No. 11/732,086 (U.S. Patent App. Pub. No. 2007/0263249) can be used to obtain a metallic color to match, whose appearance can then be varied using the disclosed techniques.

EXAMPLES

The following examples illustrate certain exemplary embodiments of the present invention utilizing silver metallic ink. It is understood that these examples are merely exemplary, and are not to be construed as limiting.

Example 1

Silver Metallic Ink on Substrates of Different Porosity—Solid Patch

Different metallic reflective appearance was achieved by inkjet printing an ink comprising silver nanoparticles onto different porous substrates. The substrates comprised Glossy Photo paper, Semi-Gloss substrate, and Matte paper. The metallic ink was ink jet printed onto the substrates utilizing a Dimatix inkjet printing head. Solid, 100% blocks were printed with the metallic ink on different substrates. Noticeably, the metallic appearance of solid printed blocks on different substrates varies when observed. It is noted that a metallic appearance can be created by examining the reflectivity at varying angles of incidence and viewing near the specular (mirror-like) reflection direction. This effect is hard to capture in a 2D image, however.

X-Rite SP64 spectrophotometer model with sphere geometry was utilized to measure reflectance characteristics of the samples with both the specular, mirror-like reflection, included (SPIN) and excluded (SPEX). The variance, or disagreement, between the SPIN and SPEX measurements provides the proof of different reflectance characteristics of the same material when a specular viewing angle is present or avoided, respectively. The higher the difference between SPIN and SPEX, the shinier the surface will appear. As can be seen in FIGS. 1(*a*) and 1(*b*), the difference between the printed blocks measured in SPIN vs. SPEX decreases with the decreases in glossiness of the substrate, which means that the appearance of printed patches will vary depending on the chosen substrate characteristics.

It is noted that as shown in FIG. 1, the SPIN reflectance is higher towards the red end of the spectrum. This is because as the ink is laid down—the dots are individual discrete points of pigment SPIN includes the mirror-like surface reflection and SPEX only the diffuse or scattered reflectance. Scattering from small particles is inversely dependent on the wavelength so thus short wavelengths are more subject to scattering than longer wavelengths (found at the red end of the spectrum, say from 600 nm-700 nm). In SPIN mode the most specular reflected light at longer wavelengths is obtained, while at shorter wavelengths the less specular is reflected, and more diffuse reflected light is obtained.

Example 2

Silver Metallic Ink on Substrates of Different Porosity—5% Tone Steps

In a second technique, different metallic reflective appearances were achieved by inkjet printing an ink comprising silver nanoparticles onto various substrates of differing porosity with various tone steps. The substrates used included glossy photo paper, semi-gloss paper, and matte paper. The metallic ink was inkjet printed onto the substrates utilizing a Dimatix inkjet printing head. Tone steps comprising of 5% steps from 0% to 100% tone step blocks were printed with the metallic ink onto different substrates.

An X-Rite SP64 spectrophotometer model with sphere geometry was utilized to measure specular included (SPIN) and excluded (SPEX) reflectance characteristics of the samples printed in Example 2. As can be seen in FIGS. 2(*a*) and 2(*b*) for the glossy substrate, and in FIGS. 2(*c*) and 2(*d*) for the semi-gloss substrate, the spectral response in the SPIN vs. SPEX measurements varies with tone coverage. This trend is shown with 4 different coverage tones, 100%, 75%, 50% and 25%. As can clearly be seen, the difference between SPIN and SPEX is greatest at 100% tone, and least at 25% tone. Thus, one can achieve a lesser "shininess" quality by printing at lower percentage tone values.

Example 3

Colored Ink Beneath Silver Metallic Ink on Substrates of Different Porosity

In a third technique, different metallic reflective appearances were achieved by inkjet printing a colored ink comprising pigment nanoparticles followed by subsequently inkjet printing an ink comprising silver nanoparticles onto differently porous substrates at various tone steps. The substrates comprised glossy photo paper, semi-gloss paper, and matte paper. 5% and 10% tone values of colored ink were inkjet printed onto the substrates. The metallic ink was ink jet printed onto the pre-printed (with said colored tones) substrates utilizing a piezo ink jet printing head. The spectral characteristic and metallic appearance of printed blocks on different substrates varied when observed.

X-Rite SP64 spectrophotometer model with sphere geometry was utilized to measure specular included (SPIN) and excluded (SPEX) reflectance characteristics of the samples printed in FIGS. 3-5. FIG. 3 show the effect of 5% Cyan undertone under the tone steps of silver ink, FIG. 4 show the effect of 10% Cyan undertone under the tone steps of silver ink, and FIG. 5 show the effect of 10% Magenta undertone under the tone steps of silver ink. As can be seen in FIGS. 3-5 the spectral differences in the SPIN vs. SPEX measurements vary with the different colored inks used prior to printing with the metallic ink. As can be seen in these figures, the 25% metallic silver tone is the most reflective overall at the violet end of the spectrum, and is slightly less reflective, but close to, that of the 100% tone at the red side of the spectrum. This is because with a lower tone value of the silver ink, here 25%, the under color cyan reflecting in green and yellow wavelengths will be more visible.

If other CMYK colors are used, at different tone percentages, the effect is that the silver printed block gets either bluer/cyan tint, pink/magenta tint, yellow/gold tint or darker/black tint based on the amount of tone value of the CMYK inks used, respectively.

Given the variety of techniques and their various variable parameters as exemplified in the above described examples, in exemplary embodiments of the present invention, one or more of these techniques can be utilized to achieve the final or requested match—for example, to match the appearance of an offset print or a gravure print. The inventive system and methods thus facilitate a proofing process that is intended to capture and communicate the appearance of the final product so that a converter/printer can, for example, determine what a print buyer expects.

FIG. 6 depicts a process flow diagram according to an exemplary embodiment of the present invention. With reference thereto, at 601 process flow begins.

At 605 a proposed image for printing on a substrate, using various designer or SPOT colors, is received and examined. This can be a proposed package, for example, or any other substrate commonly printed on, as the case may be. For ease of description the example of a package will be referred to hereinafter in describing FIG. 6. For example, at 605 the proposed appearance of a submitted package can be examined, and at 610 it can be determined if any metallic colors are desired. If not, then process flow ends at 670, as the techniques of the present invention are not needed. If, on the other hand, metallics are desired in the proposed package, for example, then process flow continues to 615 and onward.

At 615, for example, the tint of the package can be determined, and at 620, whether it is neutral or colored. If colored, process flow moves to 625, otherwise, if neutral process flow moves to 640.

At 625 and 635, for example, a tint can be selected and printed. At 640 the gloss level for the print can be established, and at 645 the tone value for the metallic ink can be estimated. At 650 the chosen tone can be printed, and at 655 the appearance of the printed metallic evaluated. If acceptable, process flow ends at 670. If not acceptable, process flow returns at 655 to 635, where the underlying tint is printed on the substrate, followed by a gloss level being chosen at 640, and a tone value for the metallic at 645, all as described above.

It is noted in connection with the process flow depicted in FIG. 6 that it is difficult to create an electronic impression of how a metallic ink will actually look on a physical substrate on an electronic display—but the digital file will accept a place holder. An actual package, not necessarily the design being proofed, will have the appearance that is sought. So the process is a bit like putting a Pantone swatch, for example, into a digital file. The file has a reference to the Pantone color but a designer or other user makes the appearance judgment based on the external example.

Thus, the "Appearance Okay" step at 655 involves looking at an actual printed package, but the previous steps all operate in the digital realm. Therefore, there is a loop going from Appearance OK 655 back to Print Tint at 635, which is taken at 655 if the appearance is not okay. In actuality, only if one iteratively keeps printing on an actual substrate—as at 635 through 650—can a 100% match to a desired metallic ink with desired shininess and tone be obtained.

Although the present invention has been described in relation to particular exemplary embodiments thereof, many other variations, modifications and other uses will become apparent to those skilled in the art. It is preferred, therefore, that the present invention be limited not by the specific disclosure herein, but only by the appended claims.

What is claimed is:

1. A digital system for producing a variable appearance of a metallic ink, comprising:
   a data processor;
   a display;
   an inkjet printer arranged to print using stochastic halftone printing;
   substrates of various glossiness;
   a set of nonmetallic color inks; and
   at least one metallic ink;
   wherein in operation the ink jet printer prints the metallic ink at a defined tone over a nonmetallic colored ink at a defined halftone printed on a substrate of a defined glossiness to change both the hue and appearance of the metallic ink so as to match a desired metallic tone,
wherein the produced appearance of the metallic ink is a highly bright shiny metallic finish, dull structured metal appearance or a dull appearance,
wherein the system operates in a process flow comprising:
receiving a proposed image for printing on a substrate;
examining the proposed image to determine if any metallic colors are desired,
wherein if no metallic colors are desired, the process flow ends; and
wherein if metallic colors are desired in the proposed image, the process flow comprises:
   determining the tint of the proposed image;
   determining if the tint is neutral or colored,
      wherein if the tint is colored:
         (a) a tint is selected;
         (b) the tint is printed;
         (c) a gloss level for the print is established;
         (d) a tone value for the metallic ink to produce the established gloss level is estimated and chosen; and
         (e) the chosen tone value of the metallic ink is printed, and
      wherein if the tint is neutral:
         (a1) a gloss level for the print is established;
         (a2) a tone value for the metallic ink to produce the established gloss level is estimated and chosen; and
         (a3) the chosen tone value of the metallic ink is printed;
wherein in operation after (e) if the tint is colored the appearance of the printed metallic ink is evaluated visually by a user, wherein if the appearance is acceptable the process flow ends and if not acceptable, the process flow returns to (a)-(e); and
wherein in operation after (a3) if the tint is neutral the appearance of the printed metallic ink is evaluated visually by a user, wherein if the appearance is acceptable the process flow ends and if not acceptable, the process flow returns to (a1)-(a3).

2. A method of adjusting the appearance of printed metallic inks in a proofing application to match a desired result, comprising:
   varying at least one of:
   halftone level of the metallic ink,
   substrate surface properties,
   and the presence of other nonmetallic colored inks,
   wherein the method is performed by the digital system of claim 1.

3. The method of claim 2, wherein said varying of halftone level includes stochastic halftone printing.

4. The method of claim 2, wherein said substrate surface properties include one of glossy, semi-glossy and matte.

5. The method of claim 2, wherein said presence of other nonmetallic colored inks includes underprinting the metallic ink with a tone value of CMYK.

6. The method of claim 5, wherein said CMYK color is cyan and said tone value is one of 5% and 10%.

7. The method of claim 5, wherein said CMYK color is magenta and said tone value is one of 5% and 10%.

8. The method of claim 2, wherein said metallic ink and any CMYK inks are printed on the substrate using an inkjet printer.

9. The method of claim 8, wherein said inkjet printer performs one of thermal inkjet printing, piezo-electric inkjet printing and continuous inkjet printing.

10. The method of claim 2, wherein the substrate is one of nanoporous or microporous, coated or uncoated, glossy, semi-glossy, luster, matte substrates, heavyweight or lightweight papers, and opaque or transparent, treated or untreated, films, and the metallic ink comprises pigment from one of silver, gold, copper, nickel, cobalt, palladium, platinum, indium, tin, zinc, titanium, chromium.

11. The system of claim 1, wherein the inkjet printer uses one of thermal ink jet printing, piezo-electric ink jet printing and continuous ink jet printing.

12. The system of claim 1, further comprising first adjusting halftones of the printed nonmetallic colored ink on the substrate beneath the metallic ink to adjust the shade/color appearance.

13. The system of claim 1, further comprising printing at least one colored ink stochastically simultaneously with the metallic ink to adjust the shade/color appearance.

14. The system of claim 1, wherein in operation the substrate, tone value of the metallic ink and tone value of any underprinted colored ink are defined by a user via the data processor and display.

15. The system of claim 1, wherein the substrate is one of nanoporous or microporous, coated or uncoated, glossy, semi-glossy, luster, matte substrates, heavyweight or lightweight papers, and opaque or transparent, treated or untreated, films, and the metallic ink comprises pigment from one of silver, gold, copper, nickel, cobalt, palladium, platinum, indium, tin, zinc, titanium, chromium.

* * * * *